March 15, 1960  L. A. HAINES ET AL  2,928,648
TURBINE BEARING SUPPORT

Filed March 1, 1954  3 Sheets-Sheet 1

INVENTORS
LAWRENCE A. HAINES
LESLIE C. SMALL JR.
BY
ATTORNEY

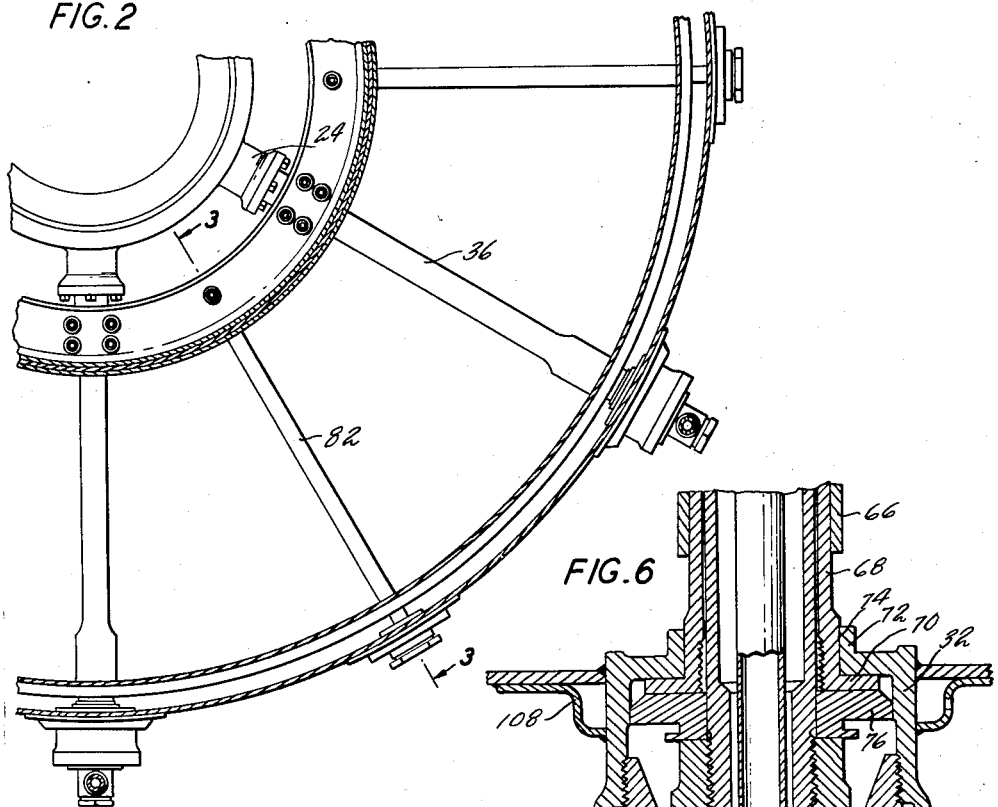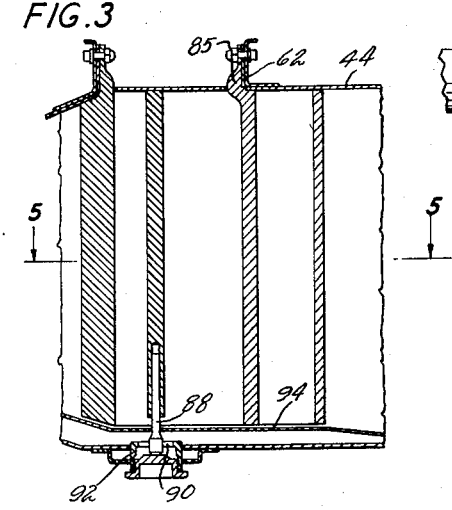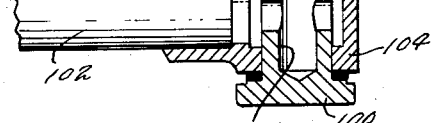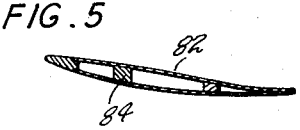
INVENTORS
LAWRENCE A. HAINES
LESLIE C. SMALL JR.
BY Charles A. Warren
ATTORNEY INVENTORS
LAWRENCE A. HAINES
LESLIE C. SMALL JR.
BY Charles A Warren
ATTORNEY

United States Patent Office 2,928,648
Patented Mar. 15, 1960

2,928,648

TURBINE BEARING SUPPORT

Lawrence A. Haines, West Hartford, and Leslie C. Small, Jr., South Glastonbury, Conn., assignors to United Aircraft Corporation, East Hartford, Conn., a corporation of Delaware Application March 1, 1954, Serial No. 412,976

12 Claims. (Cl. 253—39)

This invention relates to a bearing support for a gas turbine power plant, and especially to the bearing downstream of the turbine.

These bearings have been supported in a housing which is held concentrically within the turbine case by radially extending supporting pins which are slidable in either the housing or the casing to provide for relative thermal expansion. These supporting pins extend across the annular exhaust passage and impede the flow to a certain extent. One feature of the invention is an arrangement by which to reduce the impedence to the exhaust gas flow. Another feature is the support of the housing by tension rods which can be much smaller in section than the supporting pins.

One feature of the invention is an arrangement of the casing to take the bending loads applied by the support rods. Another feature is the arrangement of fairings around the rods in such a way that the thrust loads on the fairings and inner exhaust duct are not transmitted to the rods. A further feature is the arrangement for removing the support of the tail cone from the bearing support and for the support of the tail cone by the fairings. One other feature is the arrangement of other smaller fairings between the fairings around the support pins and to provide for a support for these other fairings from the casing.

Other objects and advantages will be apparent from the specification and claims, and from the accompanying drawings which illustrate an embodiment of the invention.

Fig. 2 is a sectional view substantially along the line 2—2 of Fig. 1.

Fig. 3 is a sectional view along the line 3—3 of Fig. 2.

Fig. 4 is a sectional view along the line 4—4 of Fig. 1.

Fig. 5 is a sectional view substantially along the line 5—5 of Fig. 3.

Fig. 6 is an enlarged sectional view of the outer end of one of the tubes.

Figure 1:
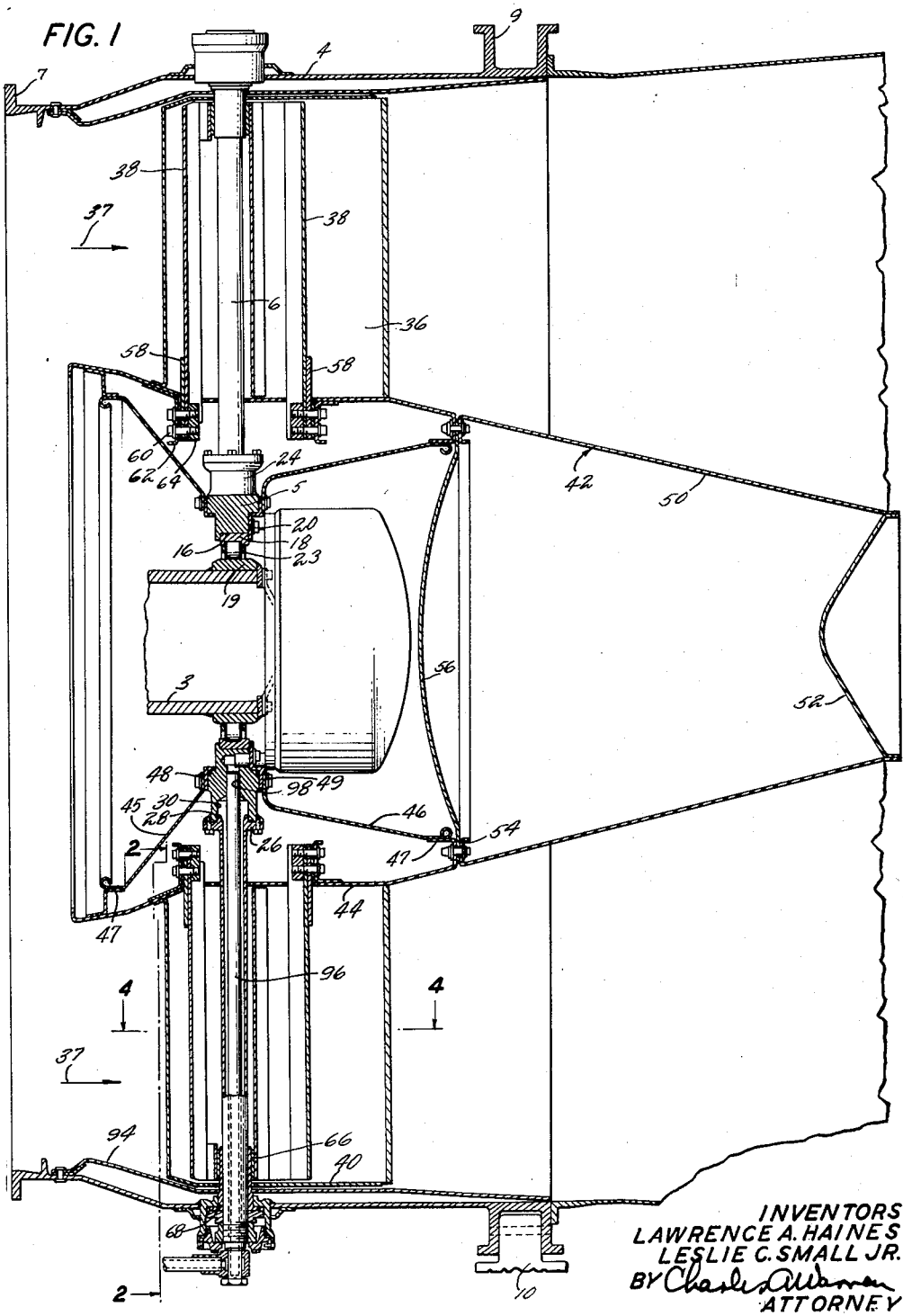
Fig. 1 is a longitudinal sectional view through the exhaust duct and rear turbine bearing.
Figure 7:
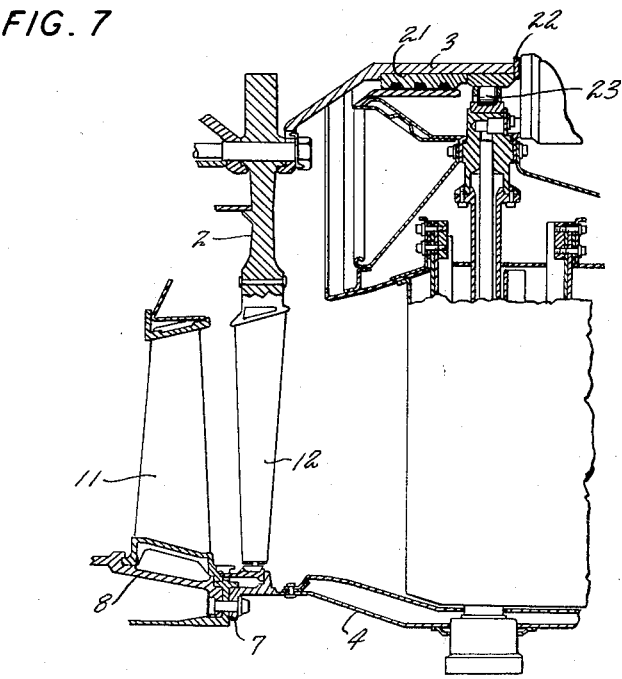
Fig. 7 is a view on a smaller scale of the last turbine stage showing its relation to the bearing.

Referring first to Figs. 1 and 7, the turbine rotor 2 has a projecting shaft 3 and is supported concentrically within a casing ring 4. A bearing housing 5 has a number of hollow rods or tubes 6 extending radially outward for engagement with the ring 4. The latter has a mounting flange 7 at its upstream end for attachment to the turbine casing 8 and at its downstream end circumferential flanges 9 which provide for mounting the downstream end of the power plant in an aircraft as by engine mounts 10 only one of which is shown. The turbine casing 8 has at least one row of nozzle vanes 11, Fig. 7, which direct the gas flowing thereover against the blades 12 on the rotor.

The tubes 6 are fastened at their inner ends to the bearing housing 5 which is in the form of a ring having on its inner surface a recess 16 to support the outer race 18 of an anti-friction bearing, the inner race 19 of which is mounted on the turbine shaft 3. The outer race is clamped in the recess 16 by a bolted disc 20. The inner race is held against axial movement on the shaft, being clamped against a sleeve 21 on the shaft by a ring 22. The anti-friction members in the form of rollers 23 are positioned between the races 18 and 19. Projecting outwardly from the ring portion of the bearing housing 5 are a number of radially extending mounting hubs 24 to which the tubes 6 are fastened. As shown in Fig. 1 each tube has a flange 26 at its inner end by means of which the tube is bolted to the outer end surface of the hub 24. Each tube also has a projecting pilot 28 which engages in a piloting recess 30 in the outer end of the hub.

The outer ends of the tubes extend through bushings or brackets 32 mounted in the casing ring 4 and the tubes 6 are placed under tension by nuts 34 engaging the threaded ends of the tubes, thereby holding the housing 5 securely in concentric relation to the casing ring 4. Each of the tubes 6 is placed under a predetermined tensile stress of such an amount that, when the power plant is started, the thermal expansion of the tubes, which occurs at a more rapid rate than the thermal expansion of the casing 4, because of the flow of hot gas around the tubes will not be great enough to relieve the tensile stress in the tubes entirely. The bushings 32 are spaced axially from the reinforcing rings 9 as shown, thereby allowing for a small deflection of the casing at the points where the bushings are located when the tensile load on the tubes 6 is greatest.

Each tube is surrounded by a fairing 36, Fig. 4, forming a turning vane for the gas discharging from the turbine in the direction shown by the arrows 37 in Fig. 1. The fairing 36 is hollow as shown and has channel shaped braces 38 therein for the purpose of reinforcement. The outer end of the fairing 36 is closed by a cover plate 40.

In the arrangement shown, the fairings or vanes 36 support the tailcone 42 which surrounds the bearing housing 5. This tailcone consists of a sleeve 44 which extends around the housing 5 and also defines the inner wall of the gas path through the exhaust duct. The sleeve 44 surrounds sealing rings 45 and 46 which are bolted respectively to upstream and downstream radial surfaces 48 and 49 on the housing 5, said rings having sliding fits with flanges 47 on the sleeve 44. The tailcone also has the conical element 50 having a cap 52 at its downstream end and having a bolting flange 54 at its upstream end by means of which it is fastened to the sleeve 44 and also to cap 56 forming a closure for the downstream end of the sleeve 44. The sealing ring 45 extends obliquely outward from its attachment to the housing 5 to its sliding fit with the sleeve 44 adjacent to the upstream edge of the sleeve. This sealing ring 45 thus forms a closure for the annular space between the sleeve 44 and the rings 45 and 46.

The several fairings 36 are rigidly connected to the tailcone. To accomplish this the end channel memebers 38 within the fairing 36 are extended inwardly beyond the fairing as shown in Fig. 1, and are reinforced by short plates 58. These channel members are attached as by bolts 60 to flanges 62 extending inwardly from the sleeve 44. The bolts 60 may engage with gang nuts 64 secured within the channel members 38.

The outer end of the fairing or vane 36 has a small bushing 66 therein which receives the inwardly projecting end of a tube or sleeve 68 which extends inwardly from the bushing or bracket 32. With this arrangement any thrust loading on the vanes 36 and tailcone will be transmitted directly to the casing 4 rather than to the support tubes 6, since fairings thus function to support the tailcone and are in turn supported by the tubes 68. Any radial growth of the fairing and tailcone as a result of thermal expansion is accommodated by the sliding fit between the bushing 66 and tube 68 and the clearance at the outer end of each bushing between it and the surrounding parts.

As best shown in Fig. 6 the tube 68 is large enough in diameter to provide a clearance between it and the support tube 6 which extends through it. The tube 68 has a flange 70 on its outer end which engages with an inwardly extending flange 72 on the bushing 32. The tube 68 is piloted within a cylindrical surface 74 provided by the flange 72 and the support tube 6 is piloted within the surrounding tube 68 by a ring 76 which surrounds the tube 6 underneath the nut 34 and which engages with the inner wall of the bushing 32 to hold the tubes 6 and 68 in concentric relation. The nut 34 clamps the ring 76 against the flange 70 and the latter is held against the flange 72 of the bushing 32. After the parts have been assembled and the desired tension applied to the support tube 6 the parts are locked in position by a clamping ring 78, the periphery of which is threaded to engage with cooperating threads on the bushing 32. This ring 78 engages with the outer end of the clamping nut 34. After all of these parts are assembled, the ring 78 may be locked against rotation as by a pin 80.

In the arrangement shown there are six tubes and fairings or vanes 36. Between these vanes 36 are positioned other vanes 82 which aid in turning the gas discharging from the turbine. These vanes 82 are thinner than the vanes 36 and have reinforcing rods 84 between the outer walls of the vanes which stiffen the vanes and also extend inwardly from the vane for attachment as by bolts 85, Fig. 3, to the flanges 62. At the outer end of each vane 82, one of the rods 84 in the vane carries an outwardly extending pin 88 the head of which fits in an axial slot 90 in a cup 92 welded into the casing 4. This slot permits relative axial movement but prevents lateral movement of the vane and thus maintains the desired circumferential spacing of the vanes.

The casing 4 may be shielded from direct contact with the gas discharging from the turbine by a ring shaped heat shield 94 attached at its upstream edge to the casing 4 adjacent to the flange 7, and which extends in spaced relation to said casing to a point adjacent to the trailing edge of the casing where it closely approaches or engages the casing 4 but is preferably not attached thereto.

Lubricant is supplied to the bearing through one of the tubes 6. The tube 6 surrounds a smaller diameter tube 96 the inner end of which is received in a radial bore 98 in the housing 5 and the outer end of which fits in a plug 100, Fig. 6, threaded into the end of the tube 6. A pipe 102 connects, through a fitting 104 with a passage 106 in the plug for flow of lubricant to the tube 96 and thence to the bearing. A similar arrangement in another tube 6 may provide for scavenging lubricant and a third tube may provide for venting the scavenge chamber surrounding the bearing.

The bushing 32 may have its attachment to the casing 4 reinforced by a cup 108, Fig. 6, surrounding the bushing and welded to the bushing and casing as shown. Since the casing 4 is relatively thin, it will be apparent that sufficient radial flexibility may be provided for the casing at the points where the bushings are located so that the casing will dish in at the bushings before the tubes 6 are overstressed. By this flexibility it is possible furthermore to maintain the stress on the tubes within the desired limits under all conditions.

In the assembly of the device, the vanes 36 and 82 are set in position, the rods or tubes 6 are inserted in the bushings 32 and the bearing housing is then placed in position. The tubes 6 are then moved radially inward into engagement with the housing and are bolted thereto. The parts of the tailcone are attached, the vanes 38 and 82 are bolted in position and the nuts 34 are then applied and tightened to establish the desired tension on the rods or tubes.

It is to be understood that the invention is not limited to the specific embodiment herein illustrated and described, but may be used in other ways without departure from its spirit as defined by the following claims.

I claim:

1. In a turbine construction, an annular casing forming the outer wall of a duct, a bearing housing positioned centrally within the casing, a plurality of rods attached to and extending outwardly from said housing, angularly spaced brackets positioned in said casing and through which said rods extend, and means engaging with the outer ends of the rods and with said brackets for applying a tensile stress to said rods.

2. In a turbine construction, an annular casing forming the outer wall of a duct, a bearing housing positioned centrally within the casing, a plurality of rods attached to and extending outwardly from said housing, angularly spaced brackets positioned in said casing and through which said rods extend, and means engaging with the outer ends of the rods and with said brackets for applying a tensile stress to said rods, said last means including a nut engageable with the end of each rod, the latter being threaded.

3. In a turbine construction, an annular casing forming the outer wall of a duct, a bearing housing positioned centrally within the casing, a plurality of rods attached to and extending outwardly from said housing, said rods projecting through said casing, and means engageable with the outer ends of the rods and with the casing externally thereof for applying a tensile stress to said rods.

4. In a turbine construction, an annular casing forming the outer wall of a duct, a bearing housing positioned centrally within the casing, a fairing surrounding the housing and defining the inner wall of the annular duct, a plurality of rods attached to and extending outwardly from said housing, said rods being engageable with the casing at their outer ends such that said rods support the bearing housing, means for applying tension to said rods, vanes surrounding the rods and extending across the annular duct, said vanes being attached at their inner ends to said fairing and means carried by the casing for supporting the vanes circumferentially and axially and providing for radial movement of the outer ends of the vanes relative to the casing at their outer ends, said means being spaced from the rods.

5. In a turbine construction, an annular casing forming the outer wall of a duct, a bearing housing positioned centrally within the casing, a fairing surounding the housing and defining the inner wall of the annular duct, a plurality of rods attached to and extending outwardly from said housing, said rods being engageable with the casing at their outer ends such that said rods support the bearing housing, means for applying tension to said rods, vanes surrounding the rods and extending across the annular duct, said vanes being attached at their inner ends to said fairing, and a sleeve in the casing surrounding and spaced from each rod, the outer end of the vane engaging and being radially slidable with respect to said sleeve.

6. In a turbine construction, an annular casing forming the outer wall of a duct, a bearing housing positioned centrally within the casing, a plurality of rods attached to and extending outwardly from said housing, annularly spaced brackets positioned in said casing and through which said rods extend and means engaging with the outer ends of the rods and with said brackets for applying a tensile stress to said rods, said casing having at a point axially spaced from said brackets a reinforcing ring extending around said casing.

7. In a turbine construction, an annular casing forming the outer wall of a duct, a bearing housing positioned centrally within the casing, a plurality of rods attached to and extending outwardly from said housing, annularly spaced brackets positioned in said casing and through which said rods extend and means engaging with the outer ends of the rods and with said brackets for applying a tensile stress to said rods, said casing having at a point axially spaced from said brackets a ring extending around said casing, said ring being constructed and arranged for attachment to an engine mount.

8. In a turbine construction, an annular casing forming the outer wall of a duct, a bearing housing positioned centrally within the casing, a plurality of rods attached to and extending outwardly from said housing, annularly spaced brackets positioned in said casing and through which said rods extend and means engaging with the outer ends of the rods and with said brackets for applying a tensile stress to said rods, said casing having at a point axially spaced from said brackets a ring extending around said casing, said casing being radially flexible adjacent to said brackets.

9. In a turbine construction, an annular casing forming the outer wall of a duct, a bearing housing positioned centrally within the casing, a plurality of rods attached to and extending outwardly from said housing and means engaging with the outer ends of the rods and with the casing for applying a tensile stress to said rods, said rods releasably attached to the bearing housing and having piloting means associated with the housing for holding the rod in position while being attached to the housing.

10. In a turbine construction, an annular casing forming the outer wall of a duct, a bearing housing positioned centrally within the casing, a plurality of rods attached to and extending outwardly from said housing, said casing having brackets therein through which the outer ends of the rods extend, a bushing positioned in each of said brackets and surrounding the associated rod, a ring around said rod and engaging the bracket to hold the rod centrally of the sleeve and a nut threaded on the outer end of the rod and engaging with the ring and sleeve to hold them in position in the bracket.

11. In a turbine construction, an annular casing forming the outer wall of a duct, a bearing housing positioned centrally within the casing, a plurality of rods attached to and extending outwardly from said housing, said casing having brackets therein through which the outer ends of the rods extend, a bushing positioned in said bracket and surrounding the associated rod, a ring around said rod and engaging the bracket to hold the rod centrally of the bushing and a nut threaded on the outer end of the rod and engaging with the ring and bushing to hold them in position in the bracket, the bearing housing having a fairing therearound, a vane surrounding each of said rods and rigidly attached at its inner end to the fairing, each vane having at its outer end a sleeve fitting over and receiving the bushing carried by the casing bracket such that the fairing and the vanes are supported by said bushings.

12. In a turbine construction, an annular casing forming an outer wall of a duct, and having associated therewith at least one row of turbine nozzle vanes, a turbine rotor positioned within said casing and having a row of blades cooperating with said vanes, a bearing for said rotor, a bearing housing supporting said bearing and positioned centrally within the casing, a plurality of rods attached to and extending outwardly from said housing, said rods projecting through the casing and means engaging with the outer ends of the rods and casing for applying a tensile stress to said rods.

References Cited in the file of this patent

UNITED STATES PATENTS

| | | |
|---|---|---|
| 1,900,128 | Persons | Mar. 7, 1933 |
| 2,414,814 | Johnson | Jan. 28, 1947 |
| 2,417,845 | Soderberg | Mar. 25, 1947 |
| 2,524,693 | Bryant | Oct. 3, 1950 |
| 2,616,662 | Mierley | Nov. 4, 1952 |
| 2,692,724 | McLeod | Oct. 26, 1954 |